UNITED STATES PATENT OFFICE.

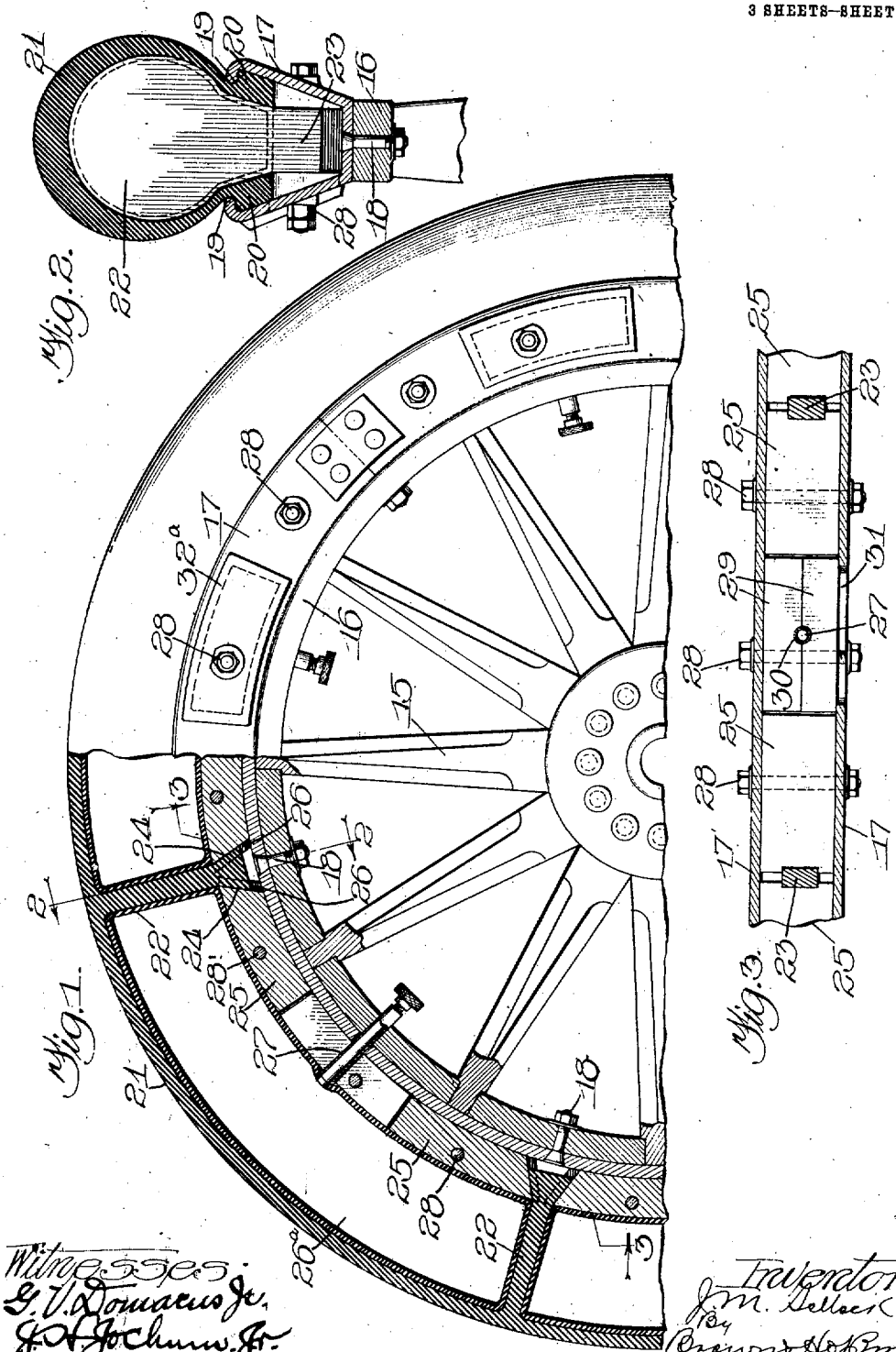
J. M. SELLECK.
VEHICLE WHEEL.
APPLICATION FILED AUG. 21, 1908.
972,930.
Patented Oct. 18, 1910.
3 SHEETS—SHEET 1.

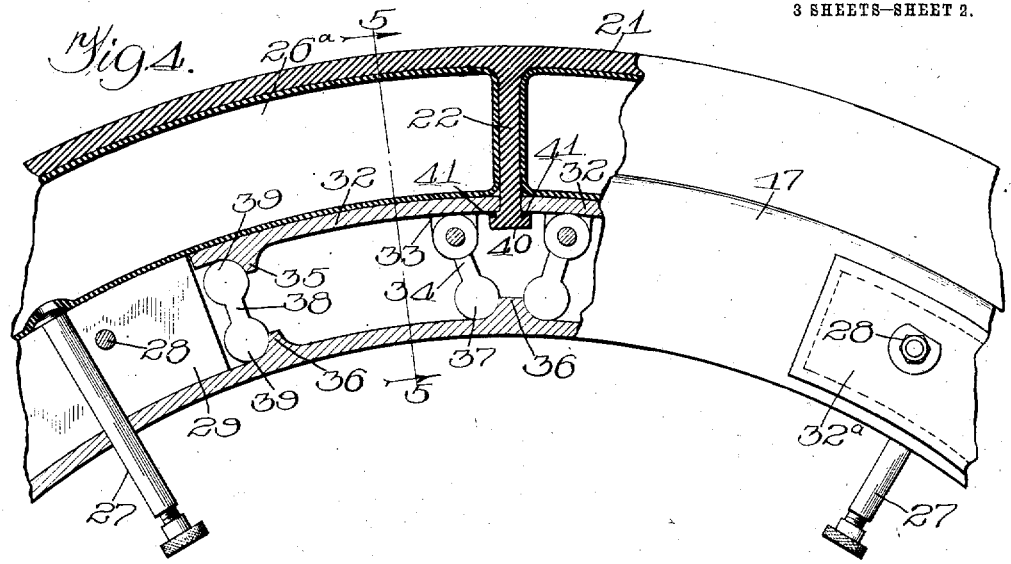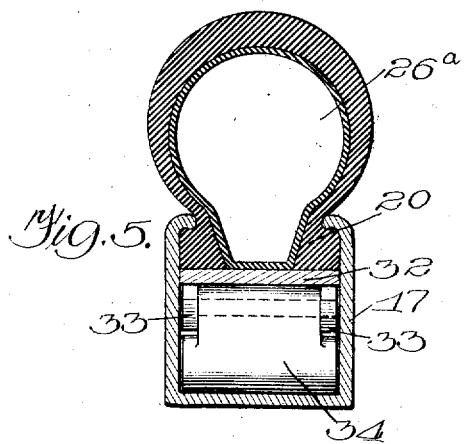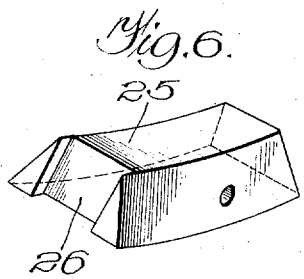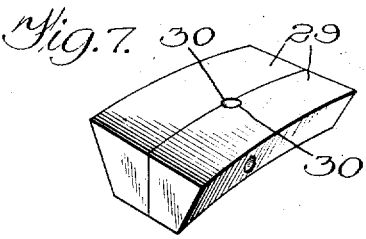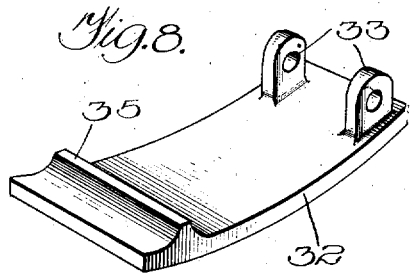

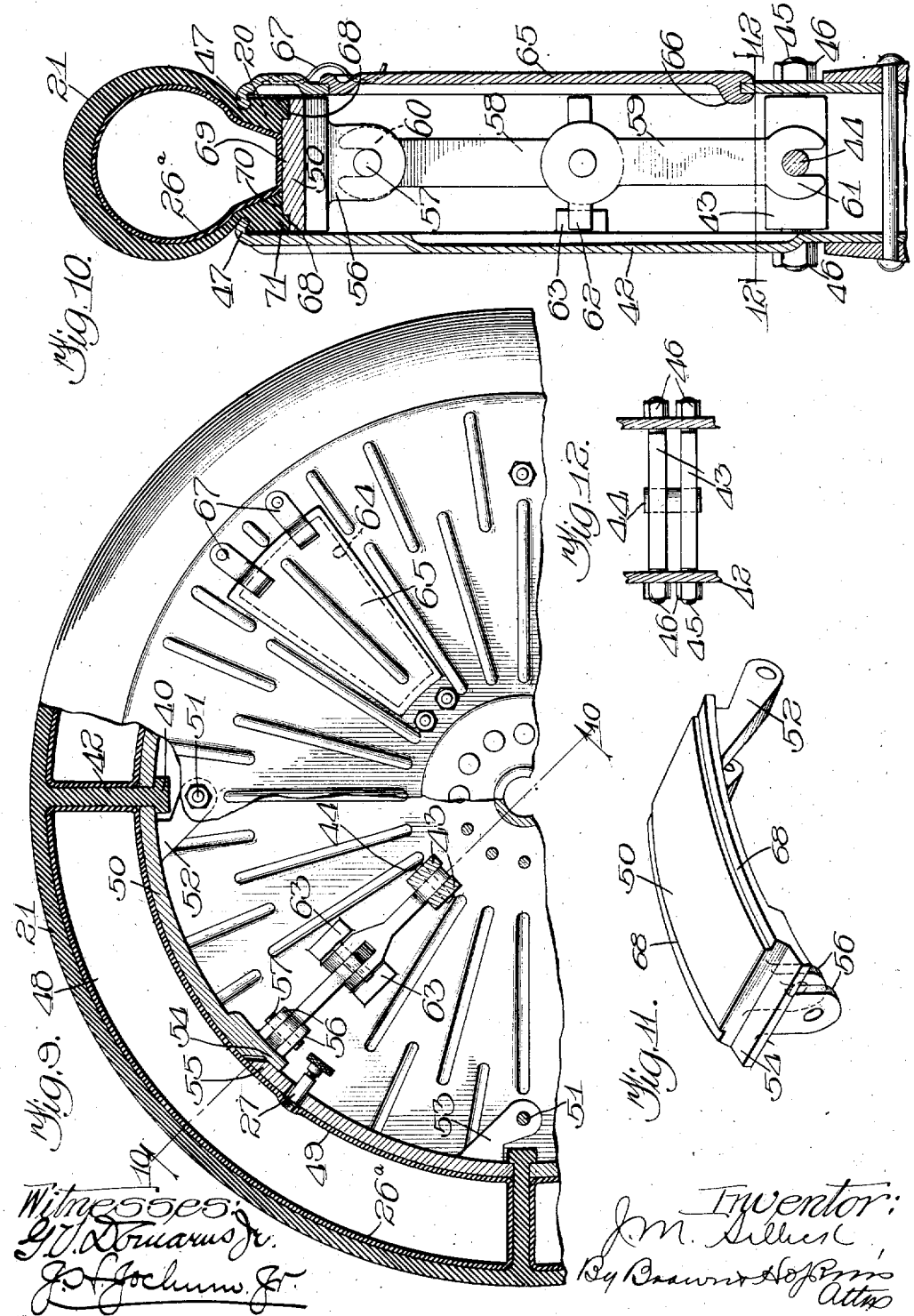

JUNE M. SELLECK, OF CHICAGO, ILLINOIS.

VEHICLE-WHEEL.

972,930.  Specification of Letters Patent.  Patented Oct. 18, 1910.

Application filed August 21, 1908. Serial No. 449,607.

*To all whom it may concern:*

Be it known that I, JUNE M. SELLECK, a citizen of the United States, residing at Chicago, in the county of Cook and State of Illinois, have invented certain new and useful Improvements in Vehicle-Wheels, of which the following is a specification.

This invention relates to improvements in vehicle wheels and the primary object of the invention is to provide an improved wheel so constructed that the inner tube of a pneumatic tire which is secured to the wheel may be readily removed from the outer tube or casing without detaching the latter from the wheel.

A further object is to provide an improved pneumatic tire including an inner tube comprising a plurality of separate sections, and improved means for securing the tire to the wheel whereby any one or more of the sections of the inner tube may be readily removed from the casing without detaching the latter from the wheel rim.

A further object is to provide improved means for securing a tire to the rim of a wheel and improved means whereby the inner tube may be readily removed from the casing through the rim of the wheel and without necessitating the removal of the casing from the wheel.

A further object is to provide an improved pneumatic tire and improved means for securing the tire to the rim of the wheel whereby any portion of the tire may be readily removed or released from the wheel rim without detaching the remaining portion of the tire.

A further object is to provide improved means for securing the tire to the wheel rim and improved means for holding or preventing the tire from slipping or creeping with respect to the wheel rim.

A further object is to provide an improved device of this character which will be simple and durable in construction and effective and efficient in operation.

To the attainment of these ends and the accomplishment of other new and useful objects, as will appear, the invention consists in the features of novelty in the construction, combination and arrangement of the several parts hereinafter more fully described and claimed and shown in the accompanying drawings illustrating embodiments of the invention, and in which—

Figure 1 is a detail elevation, partly in section, of a portion of a wheel having a tire secured thereto and constructed in accordance with the principles of this invention. Fig. 2 is a detail sectional view on line 2—2 of Fig. 1. Fig. 3 is a sectional view on line 3—3 of Fig. 1. Fig. 4 is a detail elevation, partly in section, of a portion of the wheel rim having a tire secured thereto and showing a modified form of the invention. Fig. 5 is an enlarged detail sectional view on line 5—5 of Fig. 4. Fig. 6 is a detail perspective view of one of the supporting and securing blocks or members shown in Fig. 1. Fig. 7 is a detail perspective view of another one of the supporting and securing blocks. Fig. 8 is a detail perspective view of one of the supporting and securing members for the tire shown in Fig. 4. Fig. 9 is a view similar to Fig. 1 of a modified form of the invention. Fig. 10 is a sectional view on line 10—10 of Fig. 9. Fig. 11 is a detail perspective view of one of the securing members shown in Fig. 9. Fig. 12 is a detail sectional view on line 12—12 of Fig. 10 with the parts removed.

Referring more particularly to the drawings and in the exemplification of the invention shown in Figs. 1 to 3 of the drawings, the numeral 15 designates the ordinary form of wheel provided with the usual felly 16, secured to which is a rim 17 which is preferably constructed of metal and is of a channel formation. This rim 17 may be of any desired configuration, the sides of which preferably project for some distance beyond the felly 16 and the rim may be secured to the felly in any desired or suitable manner, preferably by means of suitable fastening devices 18 passing through the bottom of the rim and the felly 16. In the exemplification of the invention shown in these figures the sides of the rim preferably diverge from each other from the felly and the upper extremities of the sides are deflected inwardly as at 19 toward each other to project over the shouldered base portions 20 of the casing 21 of the tire. The casing 21 is preferably provided at regular intervals with partitions 22 which preferably project for some distance beyond the bottom of the base portions 20 as at 23 and into the rim 17, preferably terminating short of the base of the rim, as shown more clearly in Fig. 1 of the drawings. The lower extremities 23 of the partitions 22 are preferably enlarged, as shown more clearly in Fig. 1, and are provided with inclined faces 24 arranged opposite to each other, and the depending portion 23 of the partitions are preferably of a width somewhat less than the width of the adjacent portion of the rim. Arranged within the rim 17 below the bottom of the base portions 20 of the casing are clamping members or blocks 25, one end of each of which is bifurcated as at 26 and these blocks or supporting members 25 are adapted to be inserted into the wheel rim 17 below the casing 21 and on each side of the partitions 22 so that the extremity 23 of the respective partitions will enter the bifurcated portions 26 of two adjacent clamping or supporting members 25 so that the arms of the bifurcations will project on each side of the depending portions 23 of the partitions to hold the latter against lateral displacement. The partitions 22 of the casing 21 may be spaced any suitable distance according to the length that it is desired to form the sections 26ª of the inner tube. The securing or supporting members 25 are adapted to stand beneath the sections 26 for supporting the latter and the members 25 terminate short of each other to permit the inflation tube or valve 27 to stand between the members 25 and project through the bottom of the rim 17 and the felly 16 to be accessible for the purpose of inflating the inner tube section when the latter is in position. The members 25 may be secured against the partitions 22 and against longitudinal displacement within the rim 17 in any desired or suitable manner, preferably by means of fastening devices 28 in the form of bolts which pass through the sides of the rim and the respective member 25.

A sectional block or member 29 which is divided longitudinally, as shown more clearly in Figs. 3 and 7, is arranged between the respective members 25 and is of a length to substantially fill the space between the members. Each of the sections of the member 29 is provided with a semi-circular recess 30 adapted to coöperate to form an aperture through which the inflation tube 27 of the respective inner tire section is adapted to pass, and this member 29 is also held against longitudinal displacement by means of a similar fastening device 28 which passes through both of the sections and through the sides of the rim. The sides of the rim are continuous and provide spaced members or portions. In one of the sides a plurality of apertures or openings 31 which are arranged adjacent the sectional member or support 29 and the inflation valve or tube 27, and these apertures or openings 31 are adapted to be closed by suitable closures 32, which latter may be held in position by means of the fastening bolt or device 28 which passes through the respective sectional members 29. When the parts are assembled and the inner tube section is inflated, the latter will be supported and held in position by means of the respective members 25, 29, and will be held against longitudinal movement between the partitions 22. When it is desired to remove one of the inner tube sections, all that is necessary is to remove the respective closure 32ª by removing the fastening device 28 after which the sectional member 29 may be removed and the operator may, after the inner tube section is deflated, remove the tube section from the casing into the rim 17 and from the rim through the aperture 31 in the side thereof. After the tube has been repaired, or if it is desired to insert a new section, it may be placed in the casing by first passing it through the aperture in the side of the rim and then properly locating it in the casing, after which the sections of the member 29 may be placed in position, and after the closure 32ª has been placed in position the parts may be secured against displacement by inserting the fastening device 28. When the inner tube section is thus placed in position, the latter may be inflated in the ordinary manner. It will also be noted that the members 25 coöperate with the partitions to hold the outer casing against creeping.

In the exemplification of the invention shown in Figs. 4, 5 and 8 the supporting members on each side of the respective sectional member 29 may be in the form of plates 32 depending from the lower face of which, adjacent one extremity, are spaced ears 33 pivotally connected between which is a member 34, and extending transversely across the same face of the member 32 from which the ears 33 project is a ledge or shoulder 35. With this exemplification of the invention, the sides of the rim 17 are preferably parallel and provided throughout the length of the bottom of the rim are a plurality of projections or shoulders 36 which extend transversely thereacross. When the respective members 32 are placed in position within the rim, the free extremity 37 of the member 34 is adapted to engage one face of one of the projections 36 and a similar member 38 which is preferably provided with rounded extremities 39 is arranged adjacent the opposite end of the respective member 32 so that one extremity of the member 38 will engage and rest against the shoulder 35 while the other extremity will engage and rest against one of the shoulders 36. The members 38 are adapted to engage the face of the respective shoulders adjacent the member 29 so that the latter will coöperate with the shoulders and serve to prevent displacement of the members 34, 38 and thereby hold the member 32 in operative position. In this exemplification of the invention the extremities 40 of the partitions 22 are provided with shoulders 41 which are adapted to project under the adjacent extremities of the respective members 32 so that when the members 32 are in the position shown in Fig. 4, the ends of the adjacent members 32 will stand above the shoulders 41 and coöperate with each other to grip the casing 21 to secure the latter in position and against creeping. The inner tube section 26 in this exemplification of the invention may be removed or inserted in a similar manner. After the member 29 has been removed, the respective members 32 may be rocked downwardly within the base of the rim 17 so as to disengage the partitions 40 and to permit the inner tube sections to be readily removed, and by constructing the rim with parallel sides, the member 32 may be readily adjusted.

In the exemplification shown in Figs. 9 to 11, the wheel is preferably constructed of metal comprising spaced members 42 which are held spaced from each other preferably by means of spacing members 43 which are preferably arranged in pairs and are separated by means of a transverse pin or bolt 44, the extremities of the members 43 being reduced as at 45 to pass through the members 42 and are preferably threaded to receive the fastening nuts 46. In this exemplification of the invention the peripheries of the members 42 are flanged inwardly to form the projecting portions 47 which engage over the base portions 20 of the tire casing 21 and the respective inner tube section 48 is supported by coöperating members 49, 50. One extremity of each of these members 49, 50 is pivoted as at 51 by means of suitable projecting portions 52, 53 intermediate the side members 42 of the wheel. One member is provided on the free extremity with a projecting lip 54 upon which the free extremity 55 of the other member is adapted to rest when the members 49, 50 are in position to support the inner tube section of the tire. The free ends of each of the members 49, 50 coöperate with the free ends of the members of an adjacent section to grip the enlarged extremity 40 of the partitions 22 of the outer casing 21 to hold the latter against creeping. One of the members, preferably the member 49, is provided with a suitable aperture through which the inflation tube 27 projects. The member 50 is preferably provided with spaced ears 56 projecting from the face thereof from which the projecting portions 52 extend and a transverse pin or bolt 57 projects across the ears. These projecting ears 56 are preferably arranged to stand opposite the spacing members 43 so that the connecting bolt 44 thereof will stand substantially in line with the pin or bolt 57 which extends across the ears 56. A suitable toggle lever comprising members 58, 59 having bifurcated extremities 60, 61, is adapted to be inserted between the members 42 so that the bifurcated extremities of the members thereof will respectively engage the pins or bolts 57, 44 and when the toggle is straightened or moved to the position shown in Fig. 10, the latter will hold the members 49, 50 against displacement. If desired, the members of the toggle may be provided with projections 62 adapted to stand within spaced ears 63 on one of the members 42 to hold the toggles against displacement. One of the members 42 is provided with an aperture 64 through which access may be had to the toggles and also through which the toggles may be removed or inserted and a suitable closure 65 may be removably secured in position in any desired or suitable manner for closing the apertures. If desired, the closure may be provided with a shoulder 66 adapted to engage over one of the edges of the apertures, and suitable fastening devices, such as springs 67 may be also provided.

If desired, the members 49, 50 may be cut away along their longitudinal edges as at 68 to form a longitudinal shoulder 69 and the lower edges of the base portion 20 of the tire casing may be also cut away as at 70 to form shoulders 71 adapted to coöperate or enter the cut away portions 68 of the members 59, 60, to serve as an additional means for locking the casing in position. With this form of the invention when the toggles 58, 59 are removed, the members 49, 50, may be swung about their pivots so as to move away from the tire casing, and the inner tube section may be readily removed from the casing through the aperture 64 in one of the members 42.

In order that the invention might be fully understood, the details of the foregoing embodiments thereof have been thus described, but

What I claim is—

1. In a vehicle wheel, the combination with a tire having inwardly projecting portions, of a plurality of clamping members extending circumferentially around the wheel, said projecting portions of the tire being clamped between the ends of adjacently disposed clamping members.

2. In a vehicle wheel, the combination with the rim of a wheel, of a tire whose base interlocks with said rim, said tire being provided with projections extending between the sides of the wheel rim, and a plurality of clamping members extending circumferentially around the wheel, said projections being clamped between the ends of adjacently disposed clamping members.

3. In a vehicle wheel, the combination of spaced members between which the base portion of a tire projects, said members being provided with inwardly projecting portions and adapted to extend over portions of the tire casing, clamping members housed between the first said members and coöperating with the inwardly projecting portions for clamping the tire casing in position, means for securing said clamping members in their adjusted positions, one of the first said members being provided with an opening through which access may be had to the clamping members and also through which the inner tube of the tire may be removed without removing the outer casing from the wheel, and a closure for said opening.

4. In a wheel, the combination of spaced members between which the base portion of a tire casing projects, said members being provided with laterally projecting portions adapted to extend over the base portion of the casing, and means disposed between the said members and coöperating therewith for clamping the casing in position, one of said members being constructed to permit access to said clamping means.

5. In a wheel, the combination of spaced members between which the base portion of a tire casing projects, said members being provided with laterally projecting portions adapted to extend over the base portion of the casing, and means disposed between the said members and coöperating therewith for clamping the casing in position, one of said members being adapted to permit the inner tube to be removed from the casing from the side of the wheel rim without detaching the casing from the wheel.

6. In a wheel, the combination of spaced members between which the base portion of a tire casing projects, said members being provided with laterally projecting portions extending over the base portion of the tire casing, means disposed between the said members and coöperating therewith for clamping the casing in position, said means comprising a plurality of clamping members extending around the wheel, and separate means for securing the said clamping members in position, one of said spaced members being provided with an opening through which the inner tube may be removed from the casing and through which the clamping means can be manipulated.

7. In a vehicle wheel, the combination of spaced members having inwardly projecting flanges and between which members the base of the tire projects, said flanges engaging over the said base, said tire being provided with projecting portions extending beyond the base thereof and between the said members, coöperating clamping members arranged on each side of the projecting portions of the tire, and means individual to the clamping members for securing the latter against movement to hold the tire from creeping, said clamping members also coöperating with the said flanges for securing the tire to the wheel.

8. In a vehicle wheel, the combination of spaced members having inwardly projecting flanges and between which members the base of the tire projects, said flanges engaging over the said base, said tire being provided with projecting portions extending beyond the base thereof and projecting between the said members, the free extremity of the projecting portion of the tire being enlarged, coöperating clamping members arranged on each side of the projecting portions of the tire and engaging the same beyond the enlarged portion thereof, and means individual to the clamping members for securing the latter in position, said clamping members also coöperating with the flanges on the first said member to secure the tire in position.

9. In a vehicle wheel, the combination of spaced members having inwardly projecting flanges and between which members the base of a tire casing projects, said flanges engaging over the said base, said casing being provided with partitions which project beyond the base of the casing and between the first said members, coöperating clamping members arranged on each side of the projecting portions of the partition and engaging the same, said clamping members coöperating with the flanges on the first said members to secure the casing in position, means for securing the clamping members in position, and an inner tube section within the casing between each two partitions.

10. In a vehicle wheel, the combination of spaced members having inwardly projecting flanges and between which members the base of a tire casing projects, said flanges engaging over the said base, said casing being provided with partitions which project beyond the base of the casing and between the first said members, coöperating clamping members arranged on each side of the projecting portions of the partitions and engaging the same, said clamping members coöperating with the flanges on the first said members to secure the casing in position, means for releasably securing the clamping members in position, and an inner tube section within the casing between each two partitions, the rim of the wheel being provided with an opening through which each inner section may be removed from the wheel when any one or more of the clamping members is released.

11. In a vehicle wheel, the combination of spaced members having inwardly projecting flanges and between which members the base of a tire casing projects, said flanges engaging over the said base, said casing being provided with partitions which project beyond the base of the casing and between the first said members, coöperating clamping members arranged on each side of the projecting portions of the partition and engaging the same, said clamping members coöperating with the flanges on the first said members to secure the casing in position, means for securing the clamping members in position, an inner tube section within the casing between each two partitions, and means whereby each of said tube sections may be inflated.

12. In combination in a wheel, a tire casing, a rim having spaced members between which the base of the tire casing projects, clamping members adjustable within the rim and coöperating with the sides thereof for clamping the tire casing in position, means for securing the clamping members in position, and a plurality of pneumatic sections within the casing, said clamping members also serving to hold the latter in position, the rim of the wheel being provided with openings through which said pneumatic sections may be removed separately from the casing without detaching the casing when the respective clamping members are released.

13. In combination in a wheel having spaced members forming the rim of the wheel and into which rim the base of the tire casing projects, clamping members adjustable within the rim and coöperating with the sides thereof for clamping the tire casing in position, means for securing the clamping members in position, a plurality of pneumatic sections within the casing, said clamping members also serving to hold the latter in position, and means whereby the said pneumatic sections may be inflated.

14. In combination in a wheel, having spaced members forming the rim thereof, and into which rim the base of the tire casing projects, clamping members adjustable within the rim and coöperating with the sides thereof for clamping the tire casing in position, means for securing the clamping members in position, a plurality of pneumatic sections within the casing, said clamping members also serving to hold the latter in position, said rim being provided with a plurality of apertures through which the adjacent clamping members may be adjusted and the respective pneumatic sections may be removed without detaching the casing from the rim, and means for closing said openings.

15. In combination in a wheel having spaced members forming the rim thereof, and into which rim the base of the tire casing projects, clamping members adjustable within the rim and coöperating with the sides thereof for clamping the tire casing in position, means for securing the clamping members in position, a plurality of pneumatic sections within the casing, said clamping members also serving to hold the latter in position, said rim being provided with a plurality of apertures through which the adjacent clamping members may be adjusted and the respective pneumatic sections may be removed without detaching the casing from the rim, means for closing said openings, and means whereby the pneumatic sections may be inflated.

16. In a vehicle wheel, the combination of spaced members between which the base portion of a tire projects, clamping members located between the said members and beyond the base of the tire for clamping the tire in position, said clamping members being adjustable between the members, and means for securing the clamping members in position.

17. In a vehicle wheel, the combination of spaced members between which the base portion of a tire projects, said members being provided with laterally projecting portions engaging over the base of the tire, and clamping members between the first said members and coöperating with the said laterally projecting portions to clamp the tire in position, said clamping members being provided with a projecting portion within its edges and the base of the tire being provided with a recess into which the said projecting portion extends.

18. In a vehicle wheel, the combination of spaced members between which the base portion of a tire projects, said members being provided with laterally projecting portions engaging over the base of the tire, clamping members between the first said members and coöperating with the said laterally projecting portions to clamp the tire in position, said clamping members being provided with a projecting portion within its edges and the base of the tire being provided with a recess into which the said projecting portion extends, and means for removably securing the clamping members in position.

19. In a vehicle wheel, the combination of a continuous tire, spaced members between which the base portion of the tire projects, a plurality of clamping members also located between the spaced members and extending circumferentially around the wheel and adapted to engage a portion of the tire for securing the latter to the wheel, and means for removably securing the clamping members in position, said tire being provided with portions projecting beyond the base thereof and extending between adjacent clamping members to be gripped thereby.

20. In a vehicle wheel, the combination of a continuous tire, spaced members between which the base portion of the tire projects, a plurality of clamping members also located between the spaced members and extending circumferentially around the wheel and adapted to engage a portion of the tire for securing the latter to the wheel, and means for removably securing the clamping members in position, said tire being provided with portions projecting beyond the base thereof and extending between adjacent clamping members to be gripped thereby.

In testimony whereof I have signed my name to this specification, in the presence of two subscribing witnesses, on this 17th day of August A. D. 1908.

JUNE M. SELLECK.

Witnesses:
J. H. JOCHUM, Jr.,
M. W. CANTWELL.